(12) United States Patent
Lu et al.

(10) Patent No.: US 9,357,221 B2
(45) Date of Patent: May 31, 2016

(54) METHODS AND APPARATUS FOR ADAPTIVE TRANSFORM SELECTION FOR VIDEO ENCODING AND DECODING

(75) Inventors: Xiaoan Lu, Princeton, NJ (US); Joel Sole, La Jolla, CA (US); Peng Yin, Ithaca, NY (US); Qian Xu, Folsom, CA (US); Yunfei Zheng, San Diego, CA (US)

(73) Assignee: Thomson Licensing, Issy les Moulineaux (FR)

( * ) Notice: Subject to any disclaimer, the term of this patent is extended or adjusted under 35 U.S.C. 154(b) by 293 days.

(21) Appl. No.: 13/384,796

(22) PCT Filed: Jul. 22, 2010

(86) PCT No.: PCT/US2010/002065
§ 371 (c)(1),
(2), (4) Date: Jan. 19, 2012

(87) PCT Pub. No.: WO2011/011074
PCT Pub. Date: Jan. 27, 2011

(65) Prior Publication Data
US 2012/0121009 A1    May 17, 2012

Related U.S. Application Data

(60) Provisional application No. 61/227,938, filed on Jul. 23, 2009.

(51) Int. Cl.
*H04N 7/12* (2006.01)
*G06F 15/16* (2006.01)
(Continued)

(52) U.S. Cl.
CPC ........... *H04N 19/179* (2014.11); *H04N 19/122* (2014.11); *H04N 19/14* (2014.11);
(Continued)

(58) Field of Classification Search
CPC ... H04N 19/122; H04N 19/14; H04N 19/179; H04N 19/61; H04N 19/46
USPC ..................................... 375/240.02
See application file for complete search history.

(56) References Cited

U.S. PATENT DOCUMENTS

| 7,242,814 B2 | 7/2007 | Etoh et al. |
| 2002/0114392 A1* | 8/2002 | Sekiguchi et al. ....... 375/240.15 |

(Continued)

FOREIGN PATENT DOCUMENTS

| EP | 1370087 | 12/2003 |
| EP | 2131594 | 12/2009 |

(Continued)

OTHER PUBLICATIONS

Philips, "An Adaptive Orthogonal Transform for Image Data Compression", Signal Processing Theories and Applications, vol. 3, Brussels, Aug. 24-27, 1992, pp. 1255-1257.

(Continued)

*Primary Examiner* — Dave Czekaj
*Assistant Examiner* — Tsion B Owens
(74) *Attorney, Agent, or Firm* — Patricia A. Verlangieri

(57) ABSTRACT

Methods and apparatus are provided for adaptive transform selection for video encoding and decoding. An apparatus includes a video encoder for encoding at least a block in a picture using a transform. The transform used to encode the block is selected from a plurality of transforms. The plurality of transforms is adaptively updated during the encoding of the picture.

32 Claims, 11 Drawing Sheets

(51) Int. Cl.

| | | |
|---|---|---|
| *H04N 19/179* | (2014.01) | |
| *H04N 19/70* | (2014.01) | |
| *H04N 19/172* | (2014.01) | |
| *H04N 19/46* | (2014.01) | |
| *H04N 19/122* | (2014.01) | |
| *H04N 19/61* | (2014.01) | |
| *H04N 19/14* | (2014.01) | |
| *H04N 19/177* | (2014.01) | |

(52) U.S. Cl.
CPC .......... *H04N 19/172* (2014.11); *H04N 19/177* (2014.11); *H04N 19/46* (2014.11); *H04N 19/61* (2014.11); *H04N 19/70* (2014.11)

(56) References Cited

U.S. PATENT DOCUMENTS

| | | | |
|---|---|---|---|
| 2005/0249290 A1 | 11/2005 | Gordon et al. | |
| 2005/0271156 A1* | 12/2005 | Nakano | 375/265 |
| 2006/0210181 A1 | 9/2006 | Wu et al. | |
| 2007/0098064 A1* | 5/2007 | Au et al. | 375/240.03 |
| 2007/0291849 A1* | 12/2007 | Lainema | 375/240.18 |
| 2008/0310504 A1 | 12/2008 | Ye et al. | |

FOREIGN PATENT DOCUMENTS

| | | | | |
|---|---|---|---|---|
| JP | 2002314428 | | 10/2002 | |
| JP | 2003204550 | | 7/2003 | |
| WO | WO 2008016609 A2 * | | 2/2008 | |
| WO | WO 2008057308 A2 * | | 5/2008 | ............... H04N 7/50 |
| WO | WO2008157360 | | 12/2008 | |
| WO | WO2009021062 | | 2/2009 | |
| WO | WO2009046438 | | 4/2009 | |
| WO | WO2010087807 | | 8/2010 | |

OTHER PUBLICATIONS

Waldemar et al., "Hybrid KLT-SVD Image Compression", IEEE International Conference on Acoustics, Speech, and Signal Processing, 1997, vol. 4, Munich, Germany, Apr. 21, 1997 pp. 2713-2716.
Sezer et al., "Sparse Orthonormal Transforms for Image Compression", four pages.
Sole et al., "Joint Sparsity-Based Optimization of a Set of Orthonormal 2-D Separable Block Transforms", ICIP '09, Princeton, New Jersey, 4 pages.
Tourapis et al., "H.264/MPEG-4 AVC Reference Software Manual", Joint Video Team (JVT) of ISO/IEC MPEG & ITU-T VCEG, Document: JVT-AD010, 30th Meeting: Geneva, CH, Jan. 29-Feb. 3, 2009. 89 pages.
ITU-T H.264 Standard, "International Telecommunication Union, Advnced Video Coding for Generic Audiovisual Services", Mar. 2005, 343 pages.
Ye et al., "Improved Intra Coding, ITU—Telecommunications Standardization Sector", Document: VCEG-AG11, 33rd Meeting: Shenzhen, China, Oct. 20, 2007, six pages.
Search Report
Alfonso et al., "Adaptive GOP size control in h.264/AVC encoding based on scene change detection", Proceedings of the 7th Nordic Signal Processing Symposium, 2006. NORSIG 2006, Jun. 7-9, 2006; pp. 86-89.

* cited by examiner

… (1)

METHODS AND APPARATUS FOR ADAPTIVE TRANSFORM SELECTION FOR VIDEO ENCODING AND DECODING

CROSS-REFERENCE TO RELATED APPLICATIONS

This application claims the benefit, under 35 U.S.C. §365 of International Application PCT/US2010/002065, filed Jul. 22, 2010, which was published in accordance with PCT Article 21(2) on Jan. 27, 2011 in English and which claims the benefit of U.S. Provisional Patent Application Ser. No. 61/227,938, filed Jul. 23, 2009.

TECHNICAL FIELD

The present principles relate generally to video encoding and decoding and, more particularly, to methods and apparatus for adaptive transform selection for video encoding and decoding.

BACKGROUND

The block-based discrete transform is a fundamental component of many image and video compression standards including, for example, the Joint Photographic Experts Group (JPEG), the International Telecommunication Union, Telecommunication Sector (ITU-T) H.263 Recommendation (hereinafter the "H.263 Recommendation"), the International Organization for Standardization/International Electrotechnical Commission (ISO/IEC) Moving Picture Experts Group-1 (MPEG-1) Standard, the ISO/IEC MPEG-2 Standard, the ISO/IEC MPEG-4 Part 10 Advanced Video Coding (AVC) Standard/ITU-T H.264 Recommendation (hereinafter the "MPEG-4 AVC Standard"), as well as others, and is used in a wide range of applications. The transform converts a signal into the transform domain and represents the signal as a linear combination of a set of transform basis functions. The quantization stage then follows. A good transform for video coding should: (1) de-correlate the signal to be quantized, so that scalar quantization over individual values can be effectively used without losing too much coding efficiency in comparison with vector quantization; and (2) compact the energy of the video signal into as few coefficients as possible, which allows the encoder to represent the image by a few coefficients with large magnitudes. A transform that performs well under the preceding two criteria is the Karhunen-Loeve transform (KLT). The discrete cosine transform (DCT) provides a good approximation for KLT for common image signals and is used in almost all modern video coding standards.

The DCT scheme takes advantage of the local spatial correlation property of the image/frame by dividing it into blocks of pixels (usually 4×4, 8×8, and 16×16), transforming each block from the spatial domain to the frequency domain using the discrete cosine transform and quantizing the DCT coefficients. Most image and video compression standards use a fixed two-dimensional (2-D) separable DCT block transform. If several block sizes are allowed (typically, from 4×4 to 16×16 blocks), then they use the DCT with the size corresponding to the block.

In image and video coding standards such as, for example, the MPEG-4 AVC Standard, the transform to use depends on the block size. For example, a 4×4 integer DCT is used for 4×4 blocks, an 8×8 integer DCT for 8×8 blocks, and a 4 cascaded 4×4 integer DCT for INTRA16×16 blocks. The DCT basis functions are pre-determined and do not adapt to the video content or coding parameters.

Since KLT is an optimized linear transform, in a first prior art approach, it is utilized to derive the best transform for each of the nine intra prediction modes in the MPEG-4 AVC Standard. The statistics for each mode are extracted and the corresponding KLTs are derived. Residual data for each intra prediction mode is encoded with a corresponding KLT. The nine intra modes partition the data space effectively, such that the DCT is no longer close to the best transform, so a distinctive best transform can be derived and successfully applied. In sum, the first prior art approach uses several transforms, and each of them is fixed to the intra prediction mode selected despite the video content.

In a second prior art approach, it is proposed to train one or more transforms offline and, then, the encoder selects, for each block among these blocks, transforms to optimize the compression performance. The selection is signaled for each block. However, the image and video content has data with varying statistics and properties. The encoder also operates using different coding parameters, such as different target bit rates. The variations in the original images and residual images cannot always be captured by DCT.

Turning to FIG. 1, a typical transform selection method at an encoder is indicated generally by the reference numeral 100. The method 100 includes a start block 110 that passes control to a function block 120. The function block 120 initializes a transform set, and passes control to a loop limit block 130. The loop limit block 130 begins a loop (hereinafter "loop (1)") using a variable j having a range from 1 through the number (#) of pictures in a current video sequence (being processed), and passes control to a loop limit block 140. The loop limit block 140 begins a loop (hereinafter "loop (2)") using a variable i having a range from 1 through the number (#) of blocks in a current picture being processed, and passes control to a function block 150. The function block 350 selects the best transform for a block (e.g., based on one or more criteria), and passes control to a function block 160. The function block 160 encodes block i in picture j, and passes control to a loop limit block 170. The loop limit block 170 ends the loop (2), and passes control to a loop limit block 180. The loop limit block 180 ends the loop (1), and passes control to an end block 199.

In the prior art, the transform set is trained offline with a large training data set. The training techniques can be based on the common KLT, a sparsity objective function, and so forth. During encoding, the encoder selects the best transform from the training set for each block to improve the compression performance. The selection is signaled in the bitstream, so that a corresponding decoder can parse the bitstream and decode the video signal using the same (but inverse) transform as that used by the encoder.

Turning to FIG. 2, a typical transform selection method at a decoder is indicated generally by the reference numeral 200. The method 200 includes a start block 210 that passes control to a function block 220. The function block 220 initialized a transform set, and passes control to a loop limit block 230. The loop limit block 230 begins a loop (hereinafter "loop (1)") using a variable j having a range from 1 through the number (#) of pictures in a current video sequence (being processed), and passes control to a loop limit block 240. The loop limit block 240 begins a loop (hereinafter "loop (2)") using a variable i having a range from 1 through the number (#) of blocks in a current picture being processed, and passes control to a function block 250. The function block 250 decodes the transform for the (current) block, and passes control to a function block 260. The function block 260 decodes block i in picture j, and passes control to a loop limit block 270. The loop limit block 270 ends the loop (2), and passes control to a loop limit block 280. The loop limit block 280 ends the loop (1), and passes control to an end block 299.

Thus, in method 200, for each block the decoder obtains from the bitstream the transform used by the encoder and then reconstructs the video signal using the signaled transform (inverse transform). However, the set of transforms is derived offline and cannot adapt to the input video sequence and coding parameters.

SUMMARY

These and other drawbacks and disadvantages of the prior art are addressed by the present principles, which are directed to methods and apparatus for adaptive transform selection for video encoding and decoding.

According to an aspect of the present principles, there is provided an apparatus. The apparatus includes a video encoder for encoding at least a block in a picture using a transform. The transform used to encode the block is selected from a plurality of transforms. The plurality of transforms is adaptively updated during the encoding of the picture.

According to another aspect of the present principles, there is provided a method in a video encoder. The method includes encoding at least a block in a picture using a transform. The transform used to encode the block is selected from a plurality of transforms. The plurality of transforms is adaptively updated during the encoding of the picture.

According to yet another aspect of the present principles, there is provided an apparatus. The apparatus includes a video decoder for decoding at least a block in a picture using an inverse transform. The inverse transform used to decode the block is selected from a plurality of inverse transforms. The plurality of inverse transforms is adaptively updated during the decoding of the picture.

According to a further aspect of the present principles, there is provided a method in a video decoder. The method includes decoding at least a block in a picture using an inverse transform. The inverse transform used to decode the block is selected from a plurality of inverse transforms. The plurality of inverse transforms is adaptively updated during the decoding of the picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
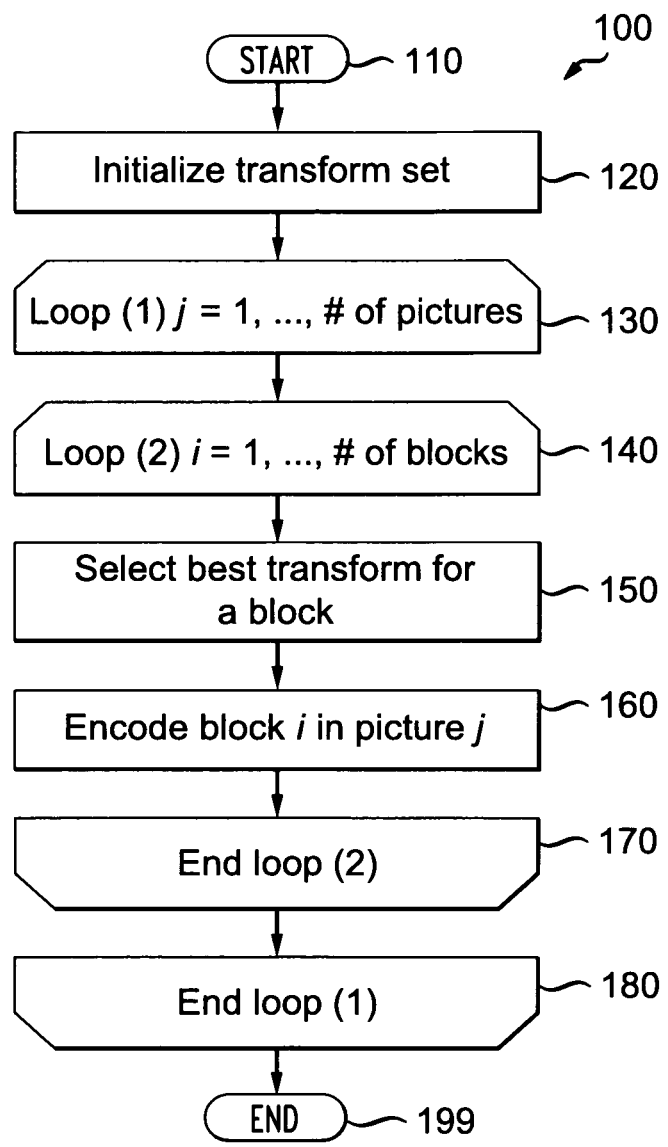
FIG. 1 is a flow diagram showing a typical transform selection method at an encoder, in accordance with the prior art.
Figure 2:
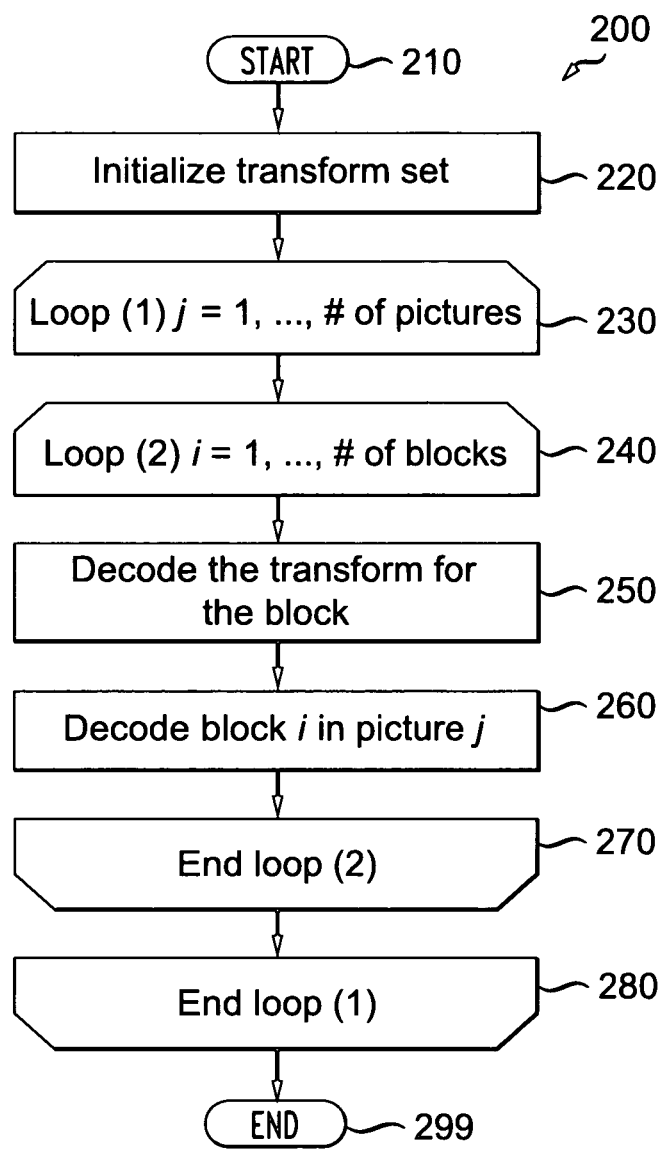
FIG. 2 is a flow diagram showing a typical transform selection method at a decoder, in accordance with the prior art.

The present principles are directed to methods and apparatus for adaptive transform selection for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Also, as used herein, the words "picture" and "image" are used interchangeably and refer to a still image or a picture from a video sequence. As is known, a picture may be a frame or a field.

Additionally, as used herein, the word "bitstream" refers to an encoder output. Of course, the encoder output can be in many forms, all of which are contemplated by the present principles. For example, a "bitstream" can be transmitted or otherwise sent as a signal using, for example, but not limited to, a broadcast, point-to-point, or multicast transmission approach, or can be recorded on fixed media such as, but not limited to, an optical, magnetic, or other storage medium.

Moreover, as used herein, the word "signal" refers to indicating something to a corresponding decoder. For example, the encoder may signal a particular transform (or subset of transforms) in order to make the decoder aware of which particular transform (or subset of transforms) was used on the encoder side. In this way, the same transform (or subset of transforms) may be used at both the encoder side and the decoder side. Thus, for example, an encoder may transmit a particular mapping function to the decoder so that the decoder may use the same transform (or subset of transforms) or, if the decoder already has the particular transform (or subset of transforms) as well as others, then signaling may be used (without transmitting) to simply allow the decoder to know and select the particular transform (or subset of transforms). By avoiding transmission of any actual transforms, a bit savings may be realized. It is to be appreciated that signaling may be accomplished in a variety of ways. For example, one or more syntax elements, flags, and so forth may be used to signal information to a corresponding decoder. While the preceding regarding signaling has been described with respect to transforms, it equally applies to inverse transforms.

Figure 3:
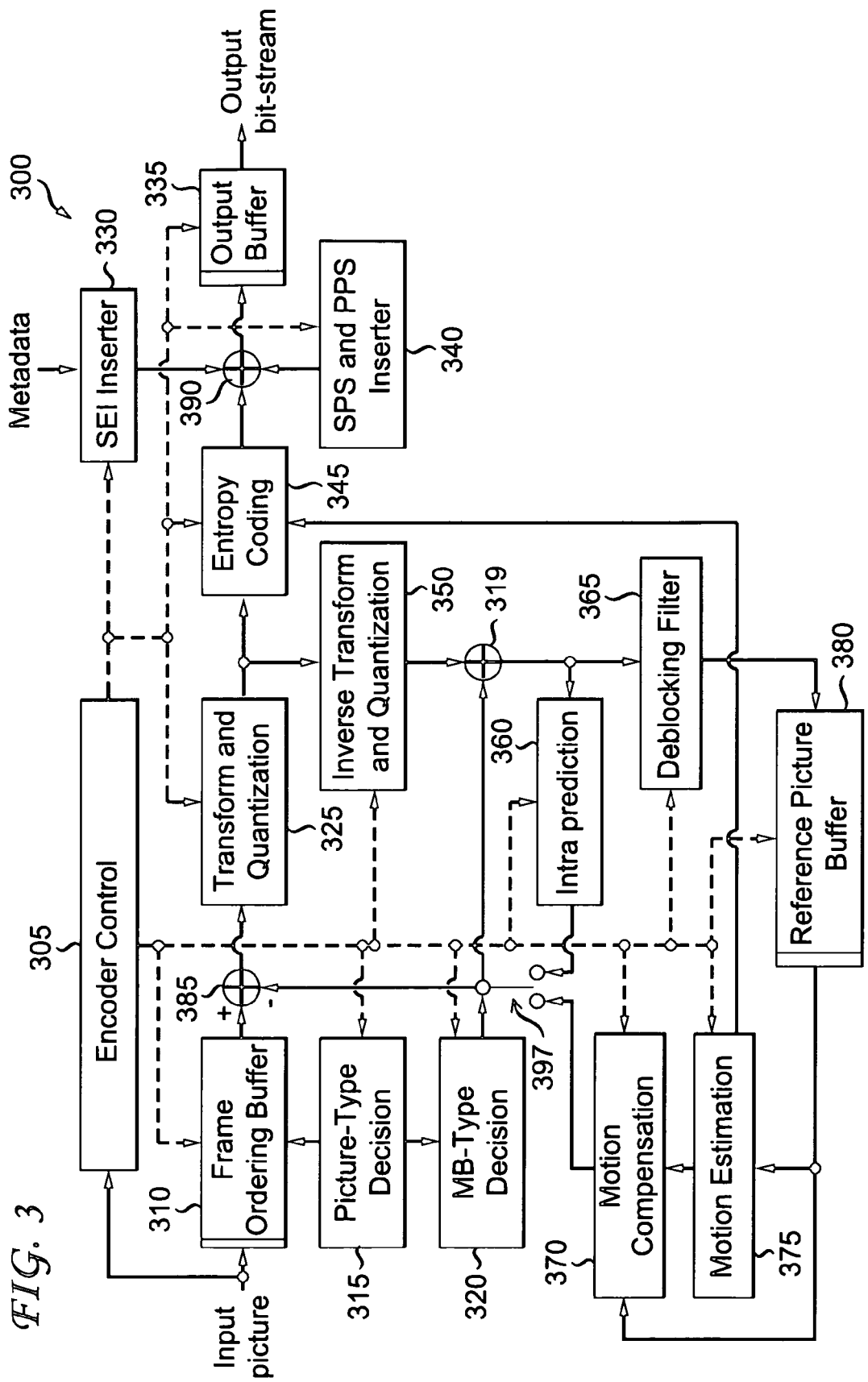
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300. The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 105 are available as inputs of the encoder 300, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
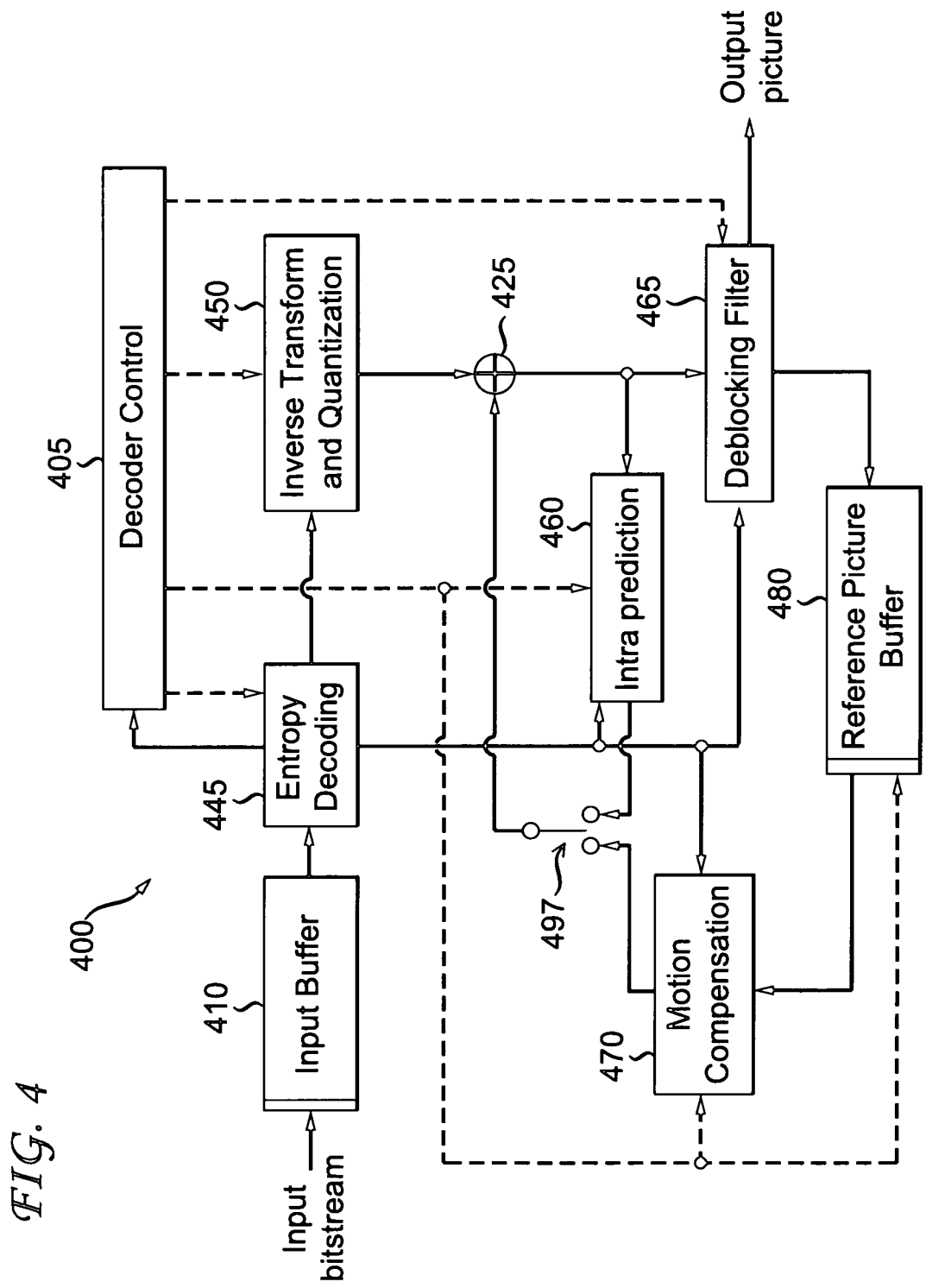
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400.

The video decoder 400 includes an input buffer 410 having an output connected in signal communication with a first input of an entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

We have recognized that there are potential compression gains available if a transform can be selectively adapted to the video content and the encoding parameters. Thus, in accordance with the present principles, we disclose and describe methods and apparatus for content-adaptive transform selection to be utilized with video encoding and decoding. Also, methodologies are described regarding how to best select which transforms are to be used. The transform set is derived during the encoding process. Since the transforms are derived during encoding, they automatically adapt to the input video sequence and coding parameters and can provide higher compression performance.

In contrast to the prior art approaches and in accordance with one or more embodiments of the present principles, the transforms used are trained in "real-time" during the encoding process using information derived from pictures that were previously encoded during the encoding process. Since the video signal is often similar between adjacent pictures within a scene, transforms trained using previous pictures are often very close to the ones for the current picture. By using previously encoded pictures, the training process automatically considers the characteristics of the input video sequence and coding parameters.

Figure 5:
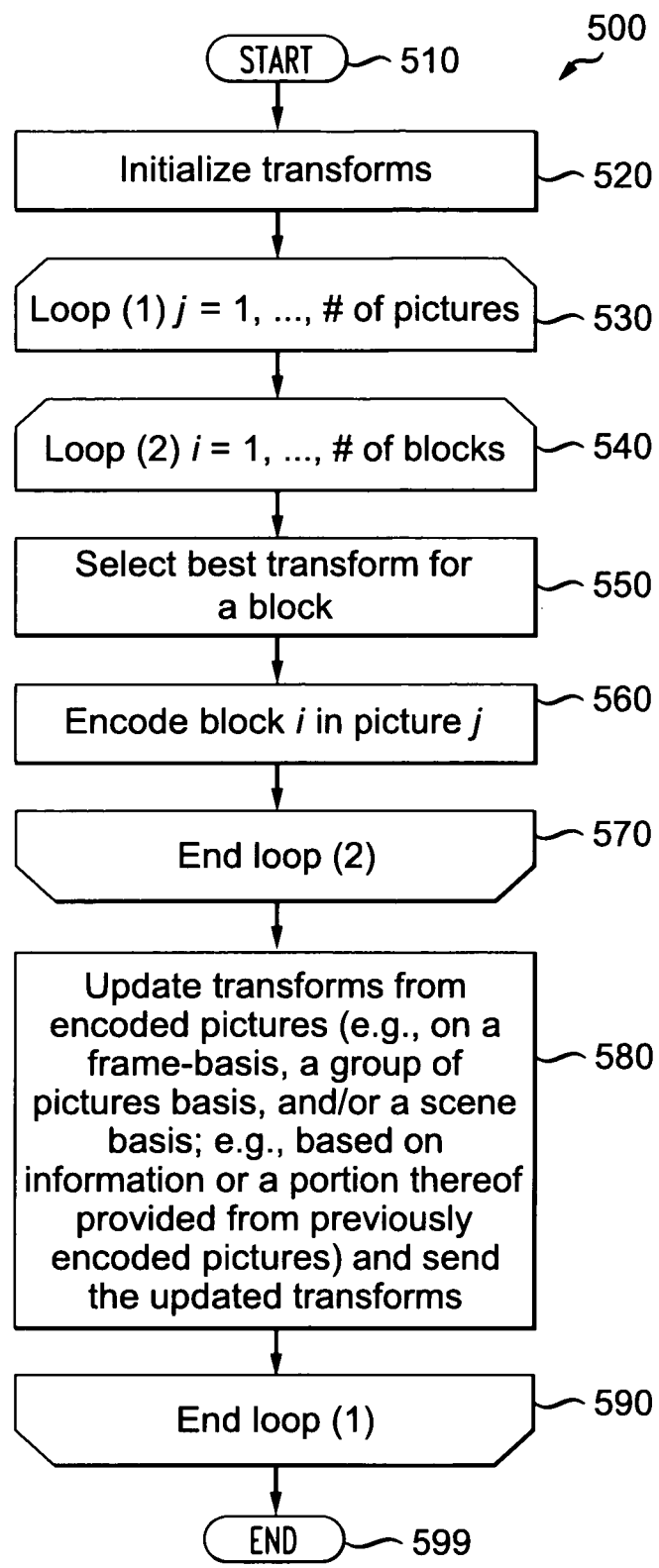
FIG. 5 is a flow diagram showing an exemplary method for encoding a picture, using transforms that are updated during encoding and transmitted to a corresponding decoder, in accordance with an embodiment of the present principles.

Turning to FIG. 5, an exemplary method for encoding a picture, using transforms that are updated during encoding and transmitted to a corresponding decoder, is indicated generally by the reference numeral 500. The method 500 includes a start block 510 that passes control to a function block 520. The function block 520 initializes a set of transforms, and passes control to a loop limit block 530. The loop limit block 530 begins a loop (hereinafter "loop (1)") using a variable j having a range from 1 through the number (#) of pictures in a current video sequence (being processed), and passes control to a loop limit block 540. The loop limit block 540 begins a loop (hereinafter "loop (2)") using a variable i having a range from 1 through the number (#) of blocks in a current picture being processed, and passes control to a function block 550. The function block 550 selects the best transform for the (current) block, and passes control to a function block 560. The function block 560 encodes block i in picture j, and passes control to a loop limit block 570. The loop limit block 570 ends the loop (2), and passes control to a function block 580. The function block 580 updates transforms from encoded pictures, sends the updated transforms, and passes control to a loop limit block 590. The loop limit block 590 ends the loop (1), and passes control to an end block 599. With respect to function block 580, the transforms may be updated, for example, on a frame-basis, a group of pictures basis and/or a scene basis. Moreover, with respect to function block 580, the transforms may be updated based on, for example, information or a portion thereof provided from previously encoded pictures.

With respect to method 500, the transform set is trained during encoding, such that the transforms are updated after each picture is coded. The update process can also be applied after a few pictures such as, for example, a group of pictures (GOP) or a scene, to reduce the computational complexity. To update the transforms, one or more coded pictures can be used. The volume of previously coded pictures to be used can be based on some rules that are known to both the encoder and decoder or may be based on some other criterion/criteria that is/are conveyed within the bitstream to the decoder. A certain reset process can be incorporated to reset the transforms to the initial ones at the scene change. For the decoder to function properly, the transforms are specifically indicated in the syntax and conveyed in the bitstream.

Figure 6:
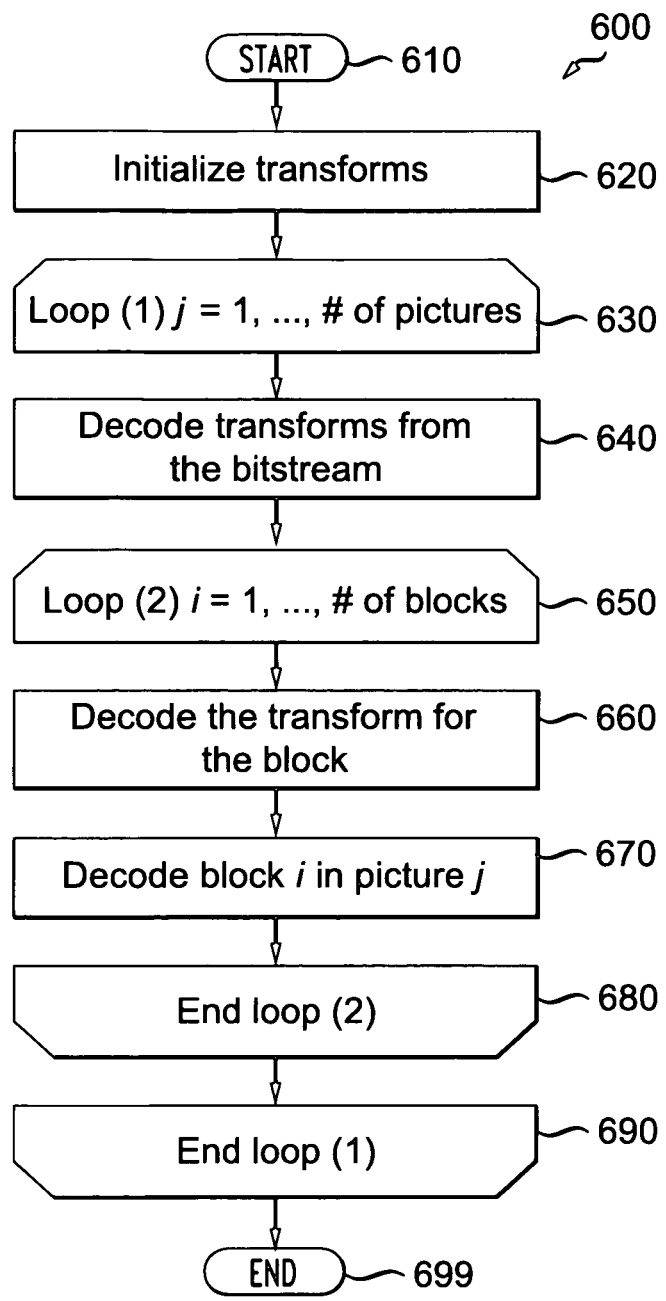
FIG. 6 is a flow diagram showing an exemplary method for decoding a picture, using updated transforms that are received from an encoder, in accordance with an embodiment of the present principles.

Turning to FIG. 6, an exemplary method for decoding a picture, using updated transforms that are received from an encoder, is indicated generally by the reference numeral 600. The method 600 includes a start block 610 that passes control to a function block 620. The function block 620 initializes a set of transforms, and passes control to a loop limit block 630. The loop limit block 630 begins a loop (hereinafter "loop (1)") using a variable j having a range from 1 through the number (#) of pictures in a current video sequence (being processed), and passes control to a function block 640. The function block 640 decodes the transforms from the bitstream, and passes control to a loop limit block 650. The loop limit block 650 begins a loop (hereinafter "loop (2)") using a variable i having a range from 1 through the number (#) of blocks in a current picture being processed, and passes control to a function block 660. The function block 660 decodes the transform for the (current) block, and passes control to a function block 670. The function block 670 decodes block i in picture j, and passes control to a loop limit block 680. The loop limit block 680 ends the loop (2), and passes control to a loop limit block 690. The loop limit block 690 ends the loop (1), and passes control to an end block 699.

With respect to method 600, the decoder parses the bitstream to derive the transform set for each picture. Then for each block the decoder obtains the transform used by the encoder and then reconstructs the video signal by using the corresponding inverse transform. Thus, in method 600, the trained transforms are received for each picture.

However, sending the transforms incurs a high overhead. Thus, we also disclose another embodiment of the present principles in which the transforms are not sent to the decoder, but instead are updated at the decoder once the decoder determines which transforms to use.

Figure 7:
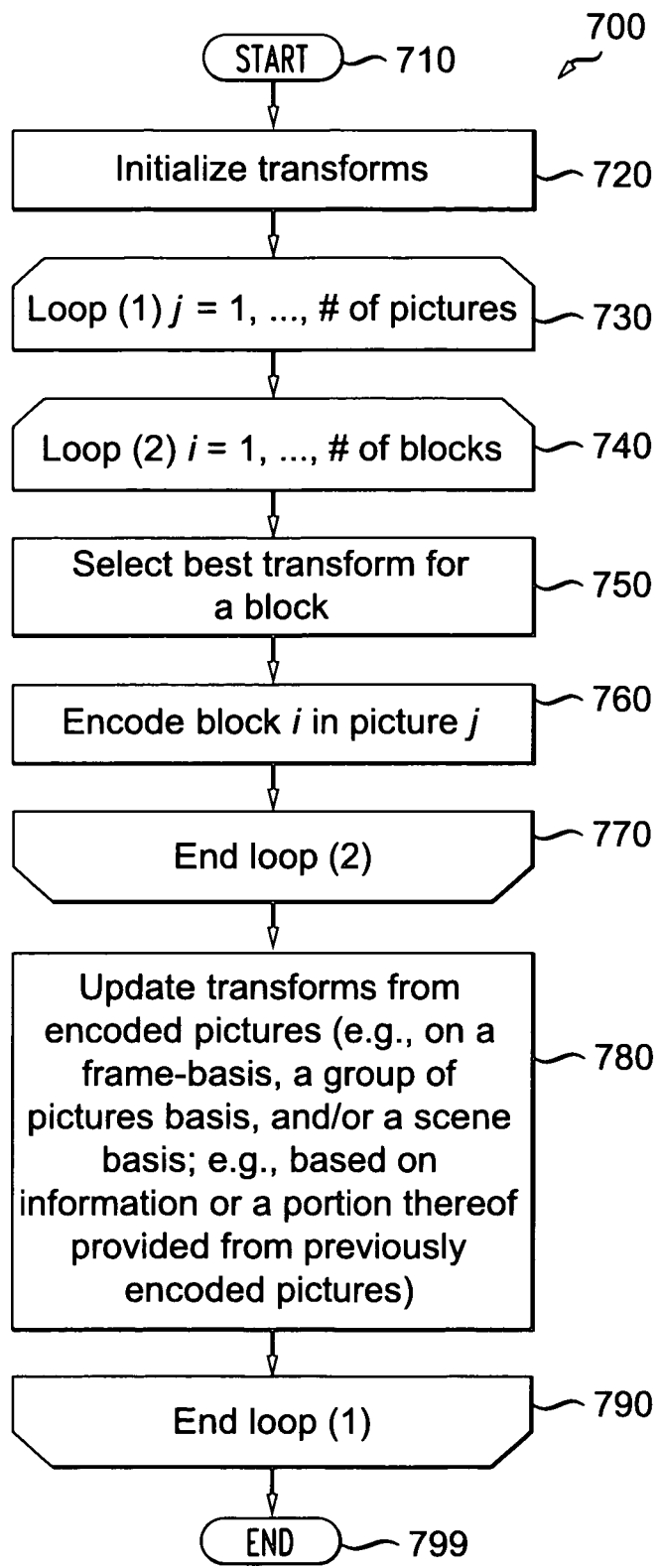
FIG. 7 is a flow diagram showing an exemplary method for encoding a picture, using transforms that are updated during encoding, in accordance with an embodiment of the present principles.

Turning to FIG. 7, an exemplary method for encoding a picture, using transforms that are updated during encoding, is indicated generally by the reference numeral 700. The method 700 includes a start block 710 that passes control to a function block 720. The function block 720 initializes a set of transforms, and passes control to a loop limit block 730. The loop limit block 730 begins a loop (hereinafter "loop (1)") using a variable j having a range from 1 through the number (#) of pictures in a current video sequence (being processed), and passes control to a loop limit block 740. The loop limit block 740 begins a loop (hereinafter "loop (2)") using a variable i having a range from 1 through the number (#) of blocks in a current picture being processed, and passes control to a function block 750. The function block 750 selects the best transform for the (current) block, and passes control to a function block 760. The function block 760 encodes block i in picture j, and passes control to a loop limit block 770. The loop limit block 770 ends the loop (2), and passes control to a function block 780. The function block 780 updates transforms from encoded pictures, and passes control to a loop limit block 790. The loop limit block 790 ends the loop (1), and passes control to an end block 799. With respect to function block 780, the transforms may be updated, for example, on a frame-basis, a group of pictures basis and/or a scene basis. Moreover, with respect to function block 780, the transforms may be updated based on, for example, information provided from previously encoded pictures or a portion of the information provided from the previously encoded pictures.

Figure 8:
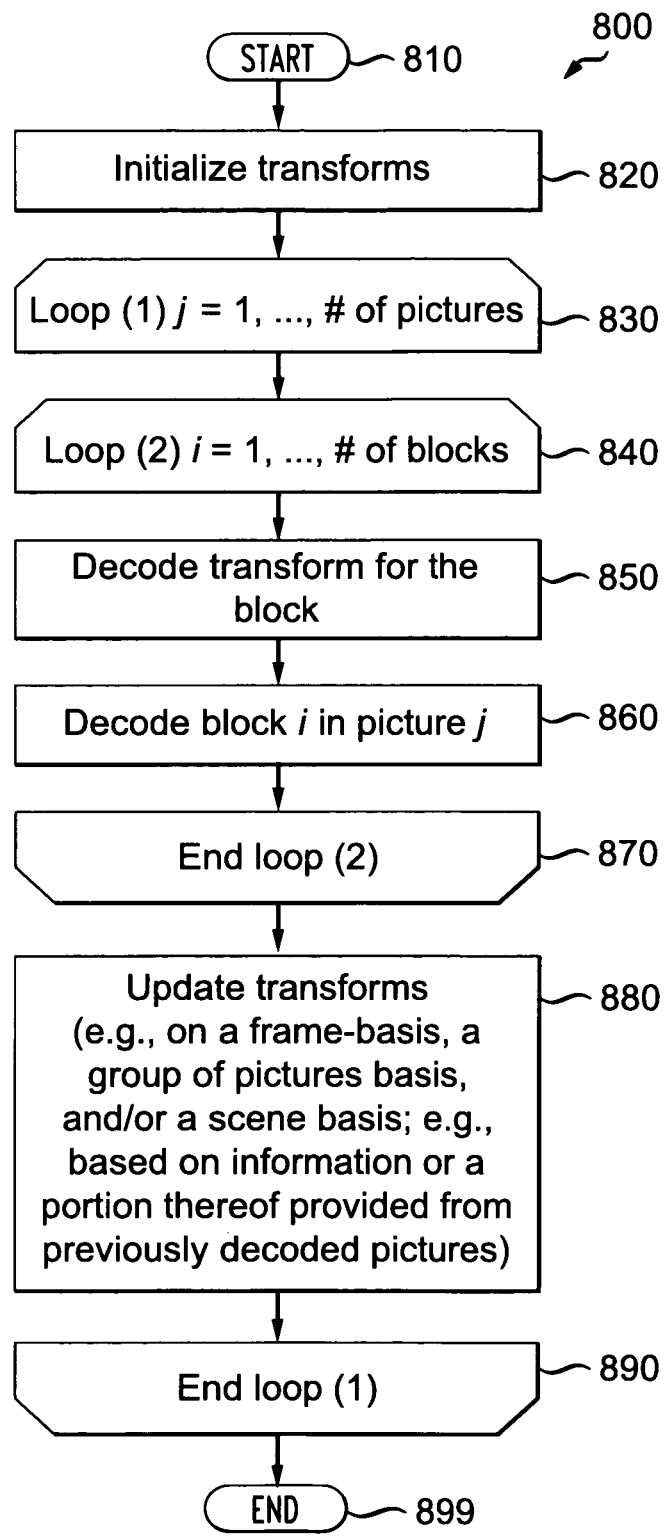
FIG. 8 is a flow diagram showing an exemplary method for decoding a picture, using transforms that are updated during decoding, in accordance with an embodiment of the present principles.

Turning to FIG. 8, an exemplary method for decoding a picture, using transforms that are updated during decoding, is indicated generally by the reference numeral 800. The method 800 includes a start block 810 that passes control to a function block 820. The function block 820 initializes a set of transforms, and passes control to a loop limit block 830. The loop limit block 830 begins a loop (hereinafter "loop (1)") using a variable j having a range from 1 through the number (#) of pictures in a current video sequence (being processed), and passes control to a loop limit block 840. The loop limit block 840 begins a loop (hereinafter "loop (2)") using a variable i having a range from 1 through the number (#) of blocks in the current picture (being processed), and passes control to a loop limit block 850. The function block 850 decodes the transforms for the block, and passes control to a function block 860. The function block 860 decodes block i in picture j, and passes control to a loop limit block 870. The loop limit block 870 ends the loop (2), and passes control to a function block 880. The function block 880 updates the transforms, and passes control to a loop limit block 890. The loop limit block 890 ends the loop (1), and passes control to an end block 899. With respect to function block 880, the transforms may be updated, for example, on a frame-basis, a group of pictures basis and/or a scene basis. Moreover, with respect to function block 880, the transforms may be updated based on, for example, information provided from previously decoded pictures or a portion of the information provided from the previously decoded pictures.

We also disclose another embodiment of the present principles in which a large number of transforms (and inverse transforms) are already known at the encoder and decoder. For each picture, we select a subset of the transforms and their indexes are sent to the decoder.

Figure 9:
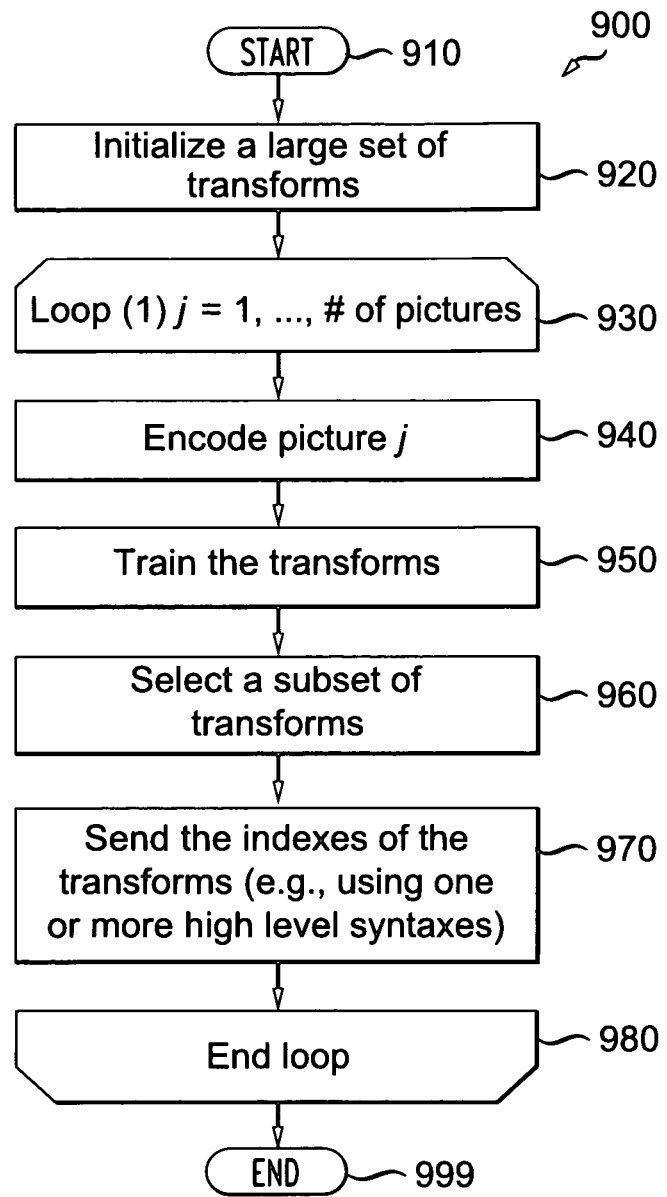
FIG. 9 is a flow diagram showing an exemplary method for encoding a picture using transforms that are updated during encoding and transform indices that are transmitted to a corresponding decoder, in accordance with an embodiment of the present principles.

Turning to FIG. 9, an exemplary method for encoding a picture, using transforms that are updated during encoding and transform indexes that are transmitted to a corresponding decoder, is indicated generally by the reference numeral 900. The method 900 includes a start block 910 that passes control to a function block 920. The function block 920 initializes a large set of transforms, and passes control to a loop limit block 930. The loop limit block 930 begins a loop using a variable j having a range from 1 through the number (#) of pictures in a current video sequence (being processed), and passes control to a function block 940. The function block 940 encodes picture j, and passes control to a function block 950. The function block 950 trains the transforms, and passes control to a function block 960. The function block 960 selects a subset of transforms (from the large set of transforms), and passes control to a function block 970. The function block 970 sends the indexes of the transforms, and passes control to a loop limit block 980. The loop limit block 980 ends the loop, and passes control to an end block 999. With respect to function block 970, the indexes of the transforms may be sent, for example, using one or more high level syntax elements.

With respect to method 900, the encoder updates the large set of transforms using the trained transforms to enable the transform set to better match the content. The transforms that are close to the trained ones are indicated through their indexes to enable a corresponding decoder to obtain such information without requiring a heavy overhead. This comes with a cost of sub-optimal transforms for the picture to select from.

Figure 10:
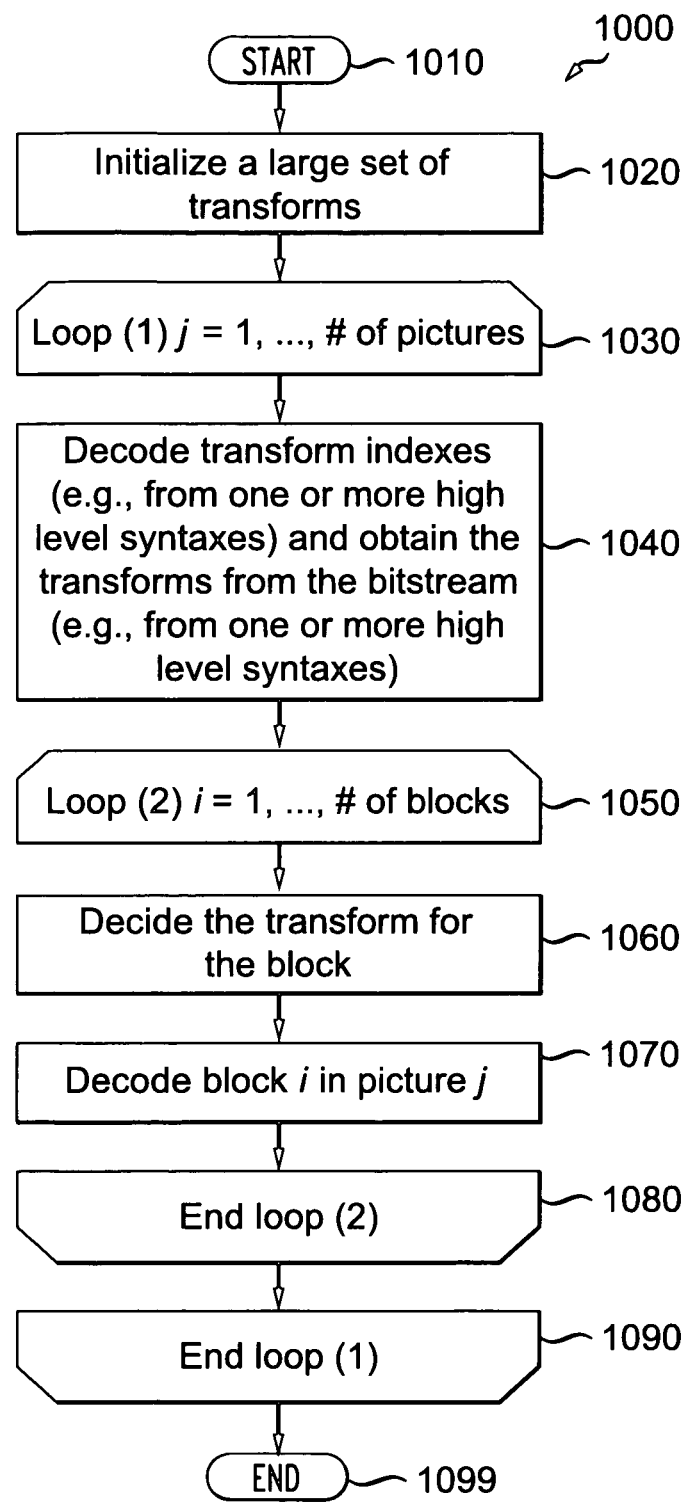
FIG. 10 is a flow diagram showing an exemplary method for decoding a picture using transform indices received from a corresponding encoder, in accordance with an embodiment of the present principles.

Turning to FIG. 10, an exemplary method for decoding a picture, using transforms indexes that are received from a corresponding encoder, is indicated generally by the reference numeral 1000. The method 1000 includes a start block 1010 that passes control to a function block 820. The function block 1020 initializes a large set of transforms, and passes control to a loop limit block 1030. The loop limit block 1030 begins a loop (hereinafter "loop (1)") using a variable j having a range from 1 through the number (#) of pictures in a current video sequence (being processed), and passes control to a function block 1040. The function block 1040 decodes transform indexes, obtains the transforms from the bitstream, and passes control to a loop limit block 1050. The loop limit block 1050 begins a loop (hereinafter "loop (2)") using a variable i having a range from 1 through the number (#) of blocks in a current picture being processed, and passes control to a function block 1060. The function block 1060 decodes the transform for the block, and passes control to a function block 1070. The function block 1070 decodes block i in picture j, and passes control to a loop limit block 1080. The loop limit block 1080 ends the loop (2), and passes control to a loop limit block 1090. The loop limit block 1090 ends the loop (1), and passes control to an end block 1099. With respect to function block 1040, the transform indexes may be decoded from, for example, one or more syntax elements in the bitstream (and/or from side information).

Figure 11:
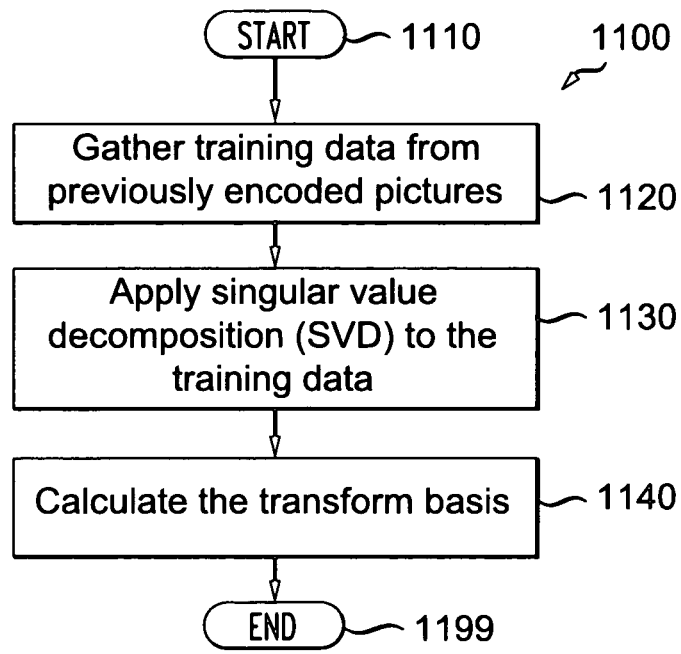
FIG. 11 is a flow diagram showing an exemplary method for deriving transforms at an encoder using singular value decomposition, in accordance with an embodiment of the present principles.

Turning to FIG. 11, an exemplary method for deriving transforms at an encoder using singular value decomposition is indicated generally by the reference numeral 1100. The method 1100 includes a start block 1110 that passes control to a function block 1120. The function block 1120 gathers training data from previously encoded pictures, and passes control to a function block 1130. With respect to the data gathered by the function block 1120, such data may include a residue or residue portion that is non-zero, so that the same transform can be used for a current picture. The function block 1130 applies singular value decomposition (SVD) to the training data, and passes control to the function block 1140. The function block 1140 calculates the transform basis, and passes control to an end block 1199.

Figure 12:
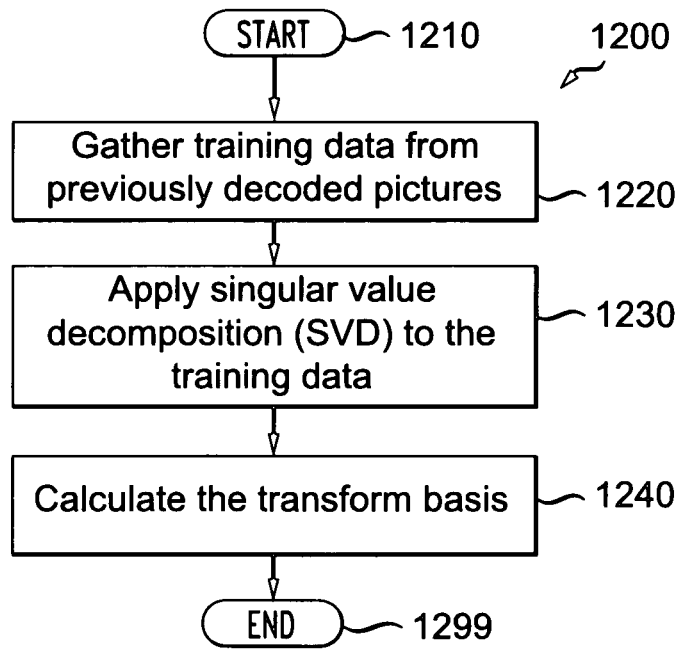
FIG. 12 is a flow diagram showing an exemplary method for deriving transforms at a decoder using singular value decomposition, in accordance with an embodiment of the present principles.

Turning to FIG. 12, an exemplary method for deriving transforms at a decoder using singular value decomposition is indicated generally by the reference numeral 1200. The method 1200 includes a start block 1210 that passes control to a function block 1220. The function block 1220 gathers training data from previously decoded pictures, and passes control to a function block 1230. The function block 1230 applies singular value decomposition (SVD) to the training data, and passes control to a function block 1240. The function block 1240 calculates the transform basis, and passes control to an end block 1299.

Syntax:

The set of transforms can be specified in, for example, one or more high level syntax elements. We provide an example of how to define the syntax for the embodiment relating to method 500 of FIG. 5. TABLE 1 shows exemplary syntax for the picture parameter set (PPS), in accordance with an embodiment of the present principles (relating to method 500). Similar syntax changes can be applied to other syntax elements, on various levels. In this example, we consider three transform sizes: 4×4; 8×8; and 16×16. For each block size, we indicate the set of transforms through the picture parameter set. N4, N8, and N16 denote the numbers of transforms in the sets for the 4×4, 8×8, and 16×16 transforms, respectively.

TABLE 1

|  | C | Descriptor |
|---|---|---|
| pic_parameter_set_rbsp( ){ |  |  |
| ... |  |  |
|    transform_selection_present_flag | 0 | u(1) |
|    if(transform_selection_present_flag){ |  |  |
|      for (i=0; i<N4; i++) { |  |  |
|        for (j=0; j<16; j++) { |  |  |
|          transform_basis_4×4[ i ][ j ] | 0 | u(8) |
|        } |  |  |
|      } |  |  |
|      for (i=0; i<N8; i++) { |  |  |
|        for (j=0; j<64; j++) { |  |  |
|          transform_basis_8×8[ i ] [ j ] | 0 | u(8) |
|        } |  |  |
|      } |  |  |
|      for (i=0; i<N16; i++) { |  |  |
|        for (j=0; j<256; j++) { |  |  |
|          transform_basis_16×16[ i ] [ j ] | 0 | u(8) |
|        } |  |  |
|      } |  |  |
|    } |  |  |
| ... |  |  |
| } |  |  |

The semantics of some of the syntax elements of TABLE 1 are as follows:

transform_selection_present_flag equal to 1 specifies that a transform selection is present in the picture parameter set. transform_selection_present_flag equal to 0 specifies that a transform selection is not present in the picture parameter set.

transform_basis_4×4[i][j] specifies the value of the $j^{th}$ transform basis element for the $i^{th}$ 4×4 transform.

transform_basis_8×8[i] [j] specifies the value of the $j^{th}$ transform basis element for the $i^{th}$ 8×8 transform.

transform_basis_16×16[i] [j] specifies the value of the $j^{th}$ transform basis element for the $i^{th}$ 16×16 transform.

We also provide an example of how to define the syntax for the embodiment relating to method 900 of FIG. 9. TABLE 2 shows exemplary syntax for the picture parameter set (PPS), in accordance with another embodiment of the present principles (relating to method 900). For each block size, we indicate the indexes of the transforms through the picture parameter set. The transforms that corresponds to the indicated indexes are known at both the encoder and decoder.

TABLE 2

| | C | Descriptor |
|---|---|---|
| pic_parameter_set_rbsp( ){ | | |
| ... | | |
|     transform_selection_present_flag | 0 | u(1) |
|     if(transform_selection_present_flag){ | | |
|         for (i=0; i<N4; i++) { | | |
|             transform_basis_4×4_index[ i ] | 0 | |
|         } | | |
|         for (i=0; i<N8; i++) { | | |
|             transform_basis_8×8_index[ i ] | 0 | |
|         } | | |
|         for(i=0; i<N16; i++) { | | |
|             transform_basis_16×16_index[ i ] | 0 | |
|         } | | |
|     } | | |
| ... | | |
| } | | |

The semantics of some of the syntax elements of TABLE 2 are as follows: transform_selection_present_flag equal to 1 specifies that a transform selection is present in the picture parameter set. transform_selection_present_flag equal to 0 specifies that a transform selection is not present in the picture parameter set.

transform_basis_4×4_index[i] specifies the index of the $i^{th}$ transform basis for 4×4 transforms.

transform_basis_8×8[i] specifies the index of the $i^{th}$ transform basis for 8×8 transforms.

transform_basis_16×16[i] specifies the index of the $i^{th}$ transform basis for 16×16 transforms.

Method to Determine a Set of Transforms for a Picture:

There exist techniques to derive an optimal set of transforms when the data to be encoded is available or there is an adequate training data set. These techniques can be based on the common KLT, on a sparsity objective function, or others. In accordance with an embodiment of the present principles, we propose a method to derive the transform set using the singular value decomposition (SVD). Of course, the present principles are not limited solely to SVD and, thus, other methods for deriving the transform set may also be used in accordance with the present principles, while maintaining the spirit and scope of the present principles. In the following example, we consider the scenario where, for a picture, the encoder can choose from two transforms and one of those two transforms is the DCT. We need to gather the training data and generate the other transform for picture n, denoted as Tsvd for a picture.

To train Tsvd for a picture, it is important that the training data set from the previously coded pictures is similar to the residue in the current picture that will select Tsvd as the transform. We propose to use only part of the residue for training. In one embodiment, this part of the whole residue data can be the residue that is non-zero and does not choose DCT in the previous picture. Then, the SVD decomposition is applied to the selected residue blocks to generate a transform Tsvd,0. For method 500 of FIG. 5, Tsvd,0 is used as Tsvd and sent in the bitstream. For method 900 of FIG. 9, Tsvd,0 is compared with each transform in the large set of transforms and the closest transform is used as Tsvd for the current picture. The index of Tsvd is sent in the bitstream.

A description will now be given of some of the many attendant advantages/features of the present invention, some of which have been mentioned above. For example, one advantage/feature is an apparatus having a video encoder for encoding at least a block in a picture using a transform. The transform used to encode the block is selected from a plurality of transforms. The plurality of transforms is adaptively updated during the encoding of the picture.

Another advantage/feature is the apparatus having the video encoder as described above, wherein the plurality of transforms is adaptively updated responsive to information provided from previously encoded pictures.

Yet another advantage/feature is the apparatus having the video encoder wherein the plurality of transforms is adaptively updated responsive to information provided from previously encoded pictures as described above, wherein only a portion of the information provided from the previously encoded pictures is used to adaptively update the plurality of transforms.

Still another advantage/feature is the apparatus having the video encoder wherein the plurality of transforms is adaptively updated responsive to information provided from previously encoded pictures as described above, wherein singular value decomposition training is used to adaptively update the plurality of transforms.

Moreover, another advantage/feature is the apparatus having the video encoder wherein the plurality of transforms is adaptively updated responsive to information provided from previously encoded pictures as described above, wherein the plurality of transforms is adaptively updated based on at least one of a frame-basis, a group of pictures basis, and a scene basis.

Further, another advantage/feature is the apparatus having the video encoder as described above, wherein the selected transform is transmitted to a corresponding decoder when the selected transform is not present at the corresponding decoder or is identified to the corresponding decoder when the selected transform is already present at the corresponding decoder or is regenerated at the corresponding decoder when the selected transform is not present at the corresponding decoder.

Also, another advantage/feature is the apparatus having the video encoder as described above, wherein the picture is included in a video sequence having a plurality of pictures, and wherein the plurality of transforms and a corresponding plurality of inverse transforms are known at both the video encoder and a corresponding decoder, and a subset of at least one of the plurality of transforms and the plurality of inverse transforms is selected for each of the plurality of pictures.

Additionally, another advantage/feature is the apparatus having the video encoder wherein the picture is included in a video sequence having a plurality of pictures, and wherein the plurality of transforms and a corresponding plurality of inverse transforms are known at both the video encoder and a corresponding decoder, and a subset of at least one of the plurality of transforms and the plurality of inverse transforms is selected for each of the plurality of pictures as described above, wherein the indexes of the subset are transmitted in a corresponding bitstream using one or more high level syntax elements.

Moreover, another advantage/feature is the apparatus having the video encoder wherein the picture is included in a video sequence having a plurality of pictures, and wherein the plurality of transforms and a corresponding plurality of inverse transforms are known at both the video encoder and a corresponding decoder, and a subset of at least one of the plurality of transforms and the plurality of inverse transforms is selected for each of the plurality of pictures as described above, wherein the plurality of transforms are adaptively updated to obtain a trained plurality of transforms, and wherein a selection of the subset is based on the plurality of transforms and the trained plurality of transforms.

Further, another advantage/feature is the apparatus having the video encoder wherein the picture is included in a video sequence having a plurality of pictures, and wherein the plurality of transforms and a corresponding plurality of inverse transforms are known at both the video encoder and a corresponding decoder, and a subset of at least one of the plurality of transforms and the plurality of inverse transforms is selected for each of the plurality of pictures as described above, wherein the plurality of transforms is adaptively updated responsive to information provided from previously encoded pictures.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder including a transformer and a quantizer, the video encoder configured to encode at least a block using a transform selected from a plurality of transforms and to encode at least a second block using a second transform selected from an adaptively updated plurality of transforms,
wherein the transformer is configured to determine the adaptively updated plurality of transforms by adaptively updating the plurality of transforms, after one or more pictures are encoded, based on residue information from the encoded one or more pictures, and
wherein adaptively updating the plurality of transforms includes the transformer adaptively updating a basis of at least a transform of the plurality of transforms based on the residue information from the encoded one or more pictures.

2. In a video encoder, a method, comprising:
encoding at least a block using a transform selected from a plurality of transforms,
encoding at least a second block using a second transform selected from an adaptively updated plurality of transforms, and
determining the adaptively updated plurality of transforms by adaptively updating by a transformer the plurality of transforms after one or more pictures are encoded based on residue information from the encoded one or more pictures, and
wherein adaptively updating the plurality of transforms includes the transformer adaptively updating a basis of at least a transform of the plurality of transforms based on the residue information from the encoded one or more pictures.

3. The method of claim 2, wherein only a non-zero portion of the residue information from the previously encoded one or more pictures is used to determine the adaptively updated plurality of transforms.

4. The method of claim 2, wherein the adaptively updated plurality of transforms are determined by adaptively updating the plurality of transforms on at least one of a frame-basis, a group of pictures basis, and a scene basis.

5. The method of claim 2, further comprising one or more of the following:
transmitting the selected transform to a corresponding decoder when the selected transform is not present at the corresponding decoder;
identifying the selected transform to the corresponding decoder when the selected transform is already present at the corresponding decoder; and
regenerating the selected transform or a corresponding inverse transform at the corresponding decoder when the selected transform is not present at the corresponding decoder.

6. The method of claim 2, further comprising selecting a subset of the plurality of transforms and transmitting information identifying the subset of the plurality of transforms to a decoder.

7. The method of claim 6, wherein the identifying information includes indices of the subset of the plurality of transforms and the indices are transmitted in a corresponding bitstream using one or more high level syntax elements.

8. The method of claim 6, wherein the plurality of transforms are adaptively updated to obtain a trained plurality of transforms, and wherein a selection of the subset is based on the plurality of transforms and the trained plurality of transforms.

9. An apparatus, comprising:
a video decoder including an inverse transformer and an inverse quantizer, the video decoder configured to decode at least a block using an inverse transform selected from a plurality of inverse transforms and to decode at least a second block using a second inverse transform selected from an adaptively updated plurality of inverse transforms,
wherein the inverse transformer is configured to determine the adaptively updated plurality of inverse transforms by adaptively updating the plurality of inverse transforms, after one or more pictures are decoded, based on residue information from the decoded one or more pictures, and
wherein adaptively updating the plurality of inverse transforms includes the inverse transformer adaptively updating a basis of at least an inverse transform of the plurality of inverse transforms based on the residue information from the decoded one or more pictures.

10. In a video decoder, a method, comprising:
decoding at least a block using an inverse transform selected from a plurality of inverse transforms, and
decoding at least a second block using a second inverse transform selected from an adaptively updated plurality of inverse transforms,
determining the adaptively updated plurality of inverse transforms by adaptively updating by an inverse transformer the plurality of inverse transforms after one or more pictures are decoded based on residue information from the decoded one or more pictures, and
wherein adaptively updating the plurality of inverse transforms includes the inverse transformer adaptively updating a basis of at least an inverse transform of the plurality of inverse transforms based on the residue information from the decoded one or more pictures.

11. The method of claim 10, wherein only a non-zero portion of the residue information from the previously decoded one or more pictures is used to determine the adaptively updated plurality of inverse transforms.

12. The method of claim 10, wherein the adaptively updated plurality of inverse transforms are determined by adaptively updating the plurality of inverse transforms on at least one of a frame-basis, a group of pictures basis, and a scene basis.

13. The method of claim 10, further comprising one or more of the following:
receiving a transform selected by a video encoder when the selected transform is not present at the video decoder; and
receiving identification related to the selected inverse transform when the selected inverse transform is already present at the video decoder.

14. The method of claim 10, further comprising receiving information identifying a subset of the plurality of inverse transforms.

15. The method of claim 14, wherein the identifying information is includes indices of the subset of the plurality of inverse transforms and the indices are received in a corresponding bitstream using one or more high level syntax elements.

16. The method of claim 2, wherein a reset process is used to reset the adaptively updated plurality of transforms at a change of scene.

17. The method of claim 10, wherein a reset process is used to reset the adaptively updated plurality of inverse transforms at a change of scene.

18. The apparatus of claim 1, wherein only a non-zero portion of the residue information from the previously encoded one or more pictures is used to determine the adaptively updated plurality of transforms.

19. The apparatus of claim 1, wherein the adaptively updated plurality of transforms are determined by adaptively updating the plurality of transforms on at least one of a frame-basis, a group of pictures basis, and a scene basis.

20. The apparatus of claim 1, wherein the video encoder is further configured to transmit the selected transform to a corresponding decoder when the selected transform is not present at the corresponding decoder, to identify the selected transform to the corresponding decoder when the selected transform is already present at the corresponding decoder, and to regenerate the selected transform or a corresponding inverse transform at the corresponding decoder when the selected transform is not present at the corresponding decoder.

21. The apparatus of claim 1, wherein the video encoder is further configured to select a subset of the plurality of transforms and transmitting information identifying the subset of the plurality of transforms to a decoder.

22. The apparatus of claim 21, wherein the identifying information includes indices of the subset of the plurality of transforms and the indices are transmitted in a corresponding bitstream using one or more high level syntax elements.

23. The apparatus of claim 21, wherein the plurality of transforms are adaptively updated to obtain a trained plurality of transforms, and wherein a selection of the subset is based on the plurality of transforms and the trained plurality of transforms.

24. The apparatus of claim 1, wherein a reset process is used to reset the adaptively updated plurality of transforms at a change of scene.

25. The apparatus of claim 9, wherein only a non-zero portion of the residue information from the previously decoded one or more pictures is used to determine the adaptively updated plurality of inverse transforms.

26. The apparatus of claim 9, wherein the adaptively updated plurality of inverse transforms are determined by adaptively updating the plurality of inverse transforms on at least one of a frame-basis, a group of pictures basis, and a scene basis.

27. The apparatus of claim 9, wherein the video decoder is further configured to receive a transform selected by a video encoder when the selected transform is not present at the video decoder and to receive identification related to the selected inverse transform when the selected inverse transform is already present at the video decoder.

28. The apparatus of claim 9, wherein the video decoder is configured to receive information identifying a subset of the plurality of inverse transforms.

29. The apparatus of claim 28, wherein the identifying information includes indices of the subset of the plurality of inverse transforms and the indices are received in a corresponding bitstream using one or more high level syntax elements.

30. The apparatus of claim 9, wherein a reset process is used to reset the plurality of inverse transforms at a change of scene.

31. The method of claim 2, wherein singular value decomposition training is used to adaptively update the plurality of transforms.

32. The method of claim 10, wherein singular value decomposition training is used to adaptively update the plurality of inverse transforms.

* * * * *